| (12) United States Patent | (10) Patent No.: US 11,632,653 B2 |
|---|---|
| Garg et al. | (45) Date of Patent: Apr. 18, 2023 |

(54) ADAPTIVE LOCATION ALERTS

(71) Applicant: T-Mobile USA, Inc., Bellevue, WA (US)

(72) Inventors: Parag Garg, Woodinville, WA (US); Nicholas LaVassar, Issaquah, WA (US); Christopher Painter, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/244,483

(22) Filed: Apr. 29, 2021

(65) Prior Publication Data

US 2022/0353635 A1    Nov. 3, 2022

(51) Int. Cl.
*H04W 4/029*    (2018.01)
*H04W 4/02*    (2018.01)
*G06N 20/00*    (2019.01)
*H04W 8/18*    (2009.01)
*H04W 8/14*    (2009.01)

(52) U.S. Cl.
CPC ............ *H04W 4/029* (2018.02); *G06N 20/00* (2019.01); *H04W 4/023* (2013.01); *H04W 8/14* (2013.01); *H04W 8/183* (2013.01)

(58) Field of Classification Search
CPC ....... H04W 4/029; H04W 4/023; H04W 8/14; H04W 8/183; G06N 20/00
USPC ..................................................... 455/456.3
See application file for complete search history.

(56) References Cited

U.S. PATENT DOCUMENTS

| 8,326,315 | B2 | 12/2012 | Phillips et al. |
| 8,378,815 | B1 | 2/2013 | McNulty et al. |
| 8,536,999 | B2 | 9/2013 | Holcman et al. |
| 9,651,673 | B2 | 5/2017 | Lacatus et al. |
| 9,668,098 | B2 | 5/2017 | Ziskind et al. |
| 9,769,604 | B2 | 9/2017 | Lyman et al. |
| 10,198,141 | B2 | 2/2019 | Sorden et al. |
| 10,652,694 | B2 | 5/2020 | Cornwall et al. |
| 11,240,417 | B1 * | 2/2022 | Gurganus ....... H04N 21/440281 |
| 2005/0227676 | A1 * | 10/2005 | De Vries .................. H04L 9/40 455/414.1 |
| 2014/0337123 | A1 | 11/2014 | Nuernberg et al. |
| 2015/0141045 | A1 | 5/2015 | Qiu et al. |
| 2017/0295476 | A1 * | 10/2017 | Webb ..................... H04W 4/029 |
| 2020/0272948 | A1 * | 8/2020 | Meyer .................... G06Q 10/02 |
| 2020/0359175 | A1 * | 11/2020 | Schobel ............. G08B 21/0277 |

* cited by examiner

*Primary Examiner* — Hirdepal Singh
(74) *Attorney, Agent, or Firm* — Han Santos, PLLC

(57) ABSTRACT

Methods, systems, and apparatus, including computer programs encoded on a computer storage medium, for implementing adaptive geofence alerts are disclosed. In one aspect, a method includes the actions of receiving, by a server, data inputted into a first computing device of a first user. The actions further include, determining, by the server, a future location of a second user and a future time when the second user will likely be at the future location. The actions further include determining, by the server, a second computing device of the second user. The actions further include providing, for output to the second computing device, instructions to provide, to the server, location information of the second computing device based on a location of the second computing device being at least a threshold distance from the future location at the future time.

20 Claims, 3 Drawing Sheets

ADAPTIVE LOCATION ALERTS

BACKGROUND

Mobile devices can determine their location using a number of different techniques. Those techniques may include using a GPS receiver, cell tower triangulation, fingerprinting techniques based on cellular signals, and other similar techniques. Mobile devices can report their determined locations to other computing devices.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

With the proliferation of smart devices designed for children, it is important that a parent be able to determine where their child is located at various times throughout the day. One method to accomplish this would be for the child's device to collect GPS data at periodic intervals, such as every minute, and transmit the GPS data to the parent's device. While this would provide accurate location data to the parent's device, using the GPS receiver at that frequency would likely drain the battery of the child's device before the end of the day. In order for the child's device to provide accurate location without draining the battery, it would be beneficial for the child's device to determine the appropriate times to activate the GPS receiver, such as those times when the child is likely to be moving from one location to another or in an unexpected location.

In order for the child's device to determine the appropriate times to activate the GPS receiver, it would be beneficial for the child's device to be aware of the child's schedule. One way for the child's device to be aware of the child's schedule is for the parent to provide schedule information directly to the child's device. This may be laborious for the parent and may require that the parent enter each aspect of the child's schedule into an application on the parent's device or the child's device. Another way for the child's device to be aware of the child's schedule, is for the parent's device or the child's device to automatically generate the child's schedule based on analyzing interactions between the parent and the parent's device and between the parent or child and the child's device. For example, the parent and child may communicate regarding school pickup times and soccer practice times. Based on analyzing these communications and past movements of the child's device, the parent's or child's device may estimate the times when the child is likely at school and soccer practice and the locations of each.

With the schedule information, the child's device may estimate geofences around each location in the schedule. If the child's device is within the geofence of an expected location for the current time, then the child's device may decrease the frequency of collecting and transmitting GPS data. If the child's device is outside of the geofence of an expected location for the current time, then the child's device may increase the frequency of collecting and transmitting GPS data. If the current time is at the end of an activity on the schedule, then the child's device may increase the frequency of collecting and transmitting GPS data. By dynamically determining a geofence based on the schedule, the child's device is able to preserve resources and provide more frequent location updates during critical times between activities or if the child is in an unexpected location.

Figure 1:
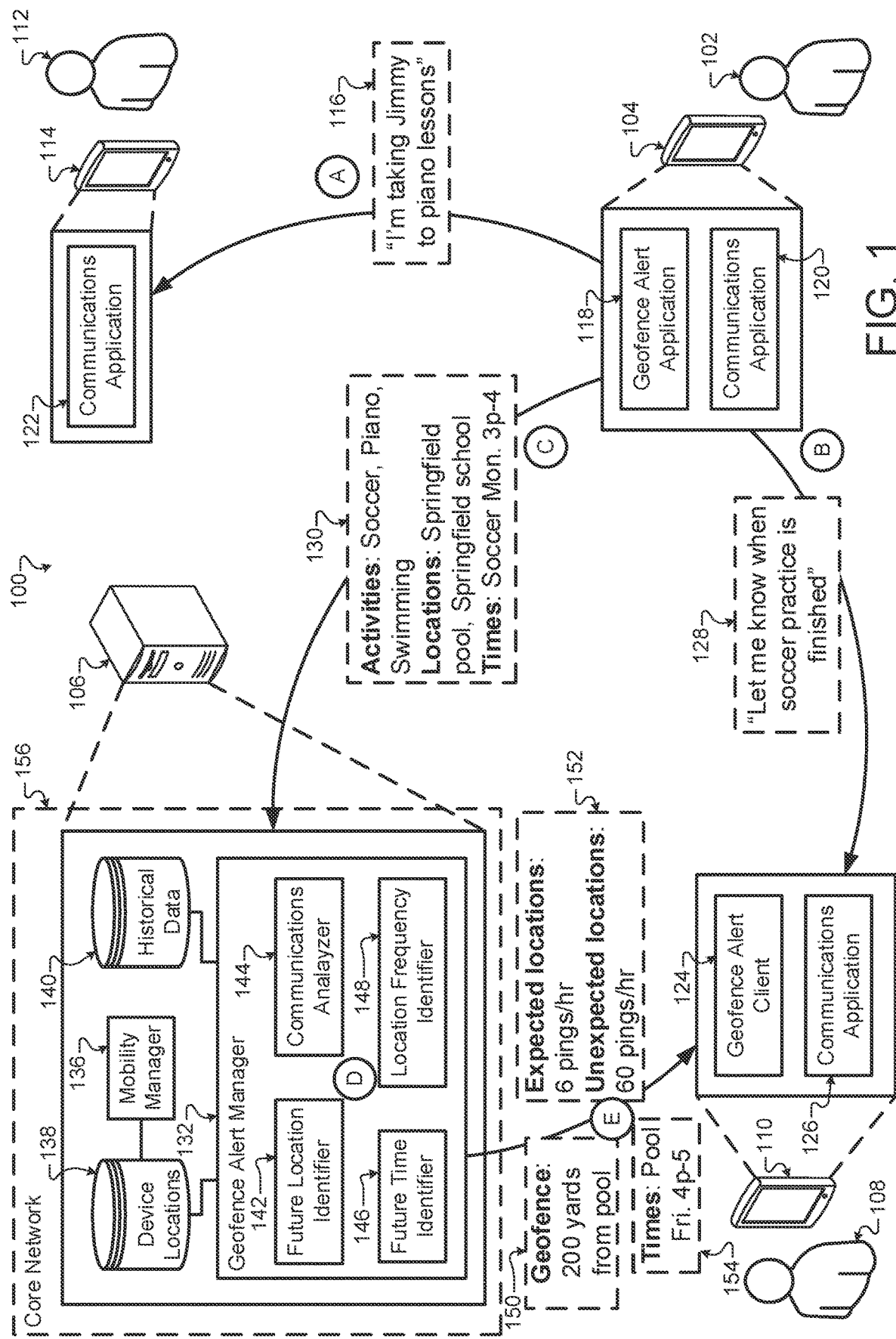
FIG. 1 illustrates an example system that is configured to generate instructions for a computing device regarding outputting location data at varying frequencies depending on where the computing device is located.

FIG. 1 illustrates an example system 100 that is configured to generate instructions for a computing device 110 regarding outputting location data at varying frequencies depending on where the computing device 110 is located. Briefly, and as described in more detail below, the system 100 includes a server 106 that is configured to analyze data exchanged among various computing devices 104, 110, and 114 and the server 106. The data may include communications between users of the computing devices 104, 110, and 114, event information provided to the server 106, and/or location information provided to the server 106. The server 106 generates a likely schedule of the user 108 of the computing device 110 based on analyzing the data. Based on the schedule, the server 106 may generate instructions for the computing device 110 regarding outputting notifications when the computing device 110 deviates from the likely schedule and/or the locations of the likely schedule. FIG. 1 includes various stages A through E that may illustrate the performance of actions and/or the movement of data between various components of the server 106 and/or between the server 106 and other computing devices 104, 110, and 114. The system 100 may perform these stages in any order.

In more detail, the user 102 may wish to monitor the location of the user 108. This may be the case if the user 102 is a parent and the user 108 is a child, the user 102 is an adult child and the user 108 is an elderly parent, and/or any other similar situation. The user 108 may have a schedule that includes going to school, visiting friends' houses, sports practice, music lessons, and/or any other activities. Each of these activities may occur at various locations. The server 106 may determine a likely schedule of the user 108 that includes the times and locations of the activities such as school, sports, and music lessons. The server 106 may determine the likely schedule of the user 108 based on various pieces of data. The data may include communications between the user 102 and the user 108 and/or communications between the user 102 and the user 112. As an example, the users 102 and 112 may be the parents of the user 108. The data may also include data that identifies activities of the user 108 and locations of activities of the user 108. For example, the user 102 may provide data to the server 106 indicating that some of the activities that the user 108 participates in are soccer and piano and some of the locations of the activities of the user 108 are the local pool. The user 102 may provide a partial list of the activities of the user 108 and a partial list of the locations of some of the identified activities and additional activities. The server 106 may analyze this data to determine a likely schedule of the user 108.

Based on the likely schedule of the user 108, the server 106 may generate instructions for the computing device 108 regarding adjusting the frequency of providing location information to the computing device 104 if the computing device 110 deviates from the locations of the likely schedule by at least a threshold distance or is outside of a geofence of the locations. For example, if the likely schedule indicates that the user 108 should be at the pool from 3-4 pm, then the instructions may indicate to increase the frequency of notifications from the computing device 110 to the computing device 104 if the computing device 110 is outside of a geofence around the pool during the time of 3-4 pm. Additionally, the instructions may indicate to increase the frequency of notifications during the time period around 4 pm when the user 108 should be leaving the pool.

In stage A, the user 102 may be communicating with the user 112. The user 102 may be using the computing device 104, and the user 112 may be communicating using the computing device 114. The computing devices 104 and 114 may be any type of computing devices. For example, the computing devices 104 and 114 may be mobile phones, tablet devices, laptop computers, desktop computers, smart watches, and/or any other type of device that is configured to transmit and receive information. The computing devices 104 and 114 may communicate over a wired and/or wireless connection that may include a cellular connection, Wi-Fi connection, short range radio connection, infrared connection, and/or any other similar connection. The computing devices may be configured to communicate directly with each other or through the server 106.

The server 106 may be included in or in communication with a network such as a wireless carrier network that provides voice and data communication services to multiple devices, such as the computing devices 104, 110, and 114 and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 106 may communicate with the computing devices 104, 110, and 114 and other devices using a Wi-Fi network, short range radio, infrared communication, and/or any other similar communication technique.

The wireless carrier network may include a radio access network and a core network 156. The radio access network may include multiple base stations. The multiple base stations are responsible for handling voice and/or data traffic between multiple devices, such as the com computing devices 104, 110, and 114 and other devices and the core network 156. Accordingly, each of the base stations may provide a corresponding network cell that delivers telecommunication and data communication coverage. The core network 156 may use the network cells to provide communication services to the multiple subscriber devices. For example, the core network 156 may connect the multiple devices to other telecommunication and data communication networks, such as the Internet and the public switched telephone network (PSTN). The base stations are responsible handling voice and data traffic between devices and the core network 156. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send radio signals to devices and receive radio signals from devices.

In order to monitor the location of the user 108 and avoid having to provide detailed schedule information to the server 106, the computing device 104 may include a geofence alert application 118. The geofence alert application 118 may be configured to allow the user 102 to manage the information that the user 102 provides to the server 106 for the server 106 to generate a likely schedule of the user 108. In some implementations, the user 102 may indicate for the geofence alert application 118 to monitor the communications between the user 102 and the user 112. In this case, the geofence alert application 118 may communicate with the communications application 120 to identify the communications between the computing device 104 of the user 102 and the computing device 114 of the user 112. The geofence alert application 118 may receive communications from the communications application 120 and provide them to the server 106 along with data that includes the time and date of the communication. In some implementations, the user 112 may provide permission for the communications of the user 112 to be included in the data that the server 106 uses to generate the likely schedule.

In the example of FIG. 1, the user 102 may transmit a message 116 to the user 112. The user 102 may use the communications application 120 to compose the message 116. For example, the user 102 may write the message 116 of "I'm taking Jimmy to piano lessons." The user 102 may send the message 116 to the user 112. The communications application 122 of the computing device 114 may receive the message 116. The user 112 may view the message 116 on the computing device 114. The geofence alert application 118 may monitor the messages of the communications application 120 and provide data indicating the message 116 to the server 106. The data indicating the message 116 may include the message 116, data identifying the users 102 and/or 112 as the sender and recipient, a timestamp, data indicating to use the message 116 to generate the likely schedule of the user 108, and/or any other similar information.

In some implementations, communications application 120 may transmit the message 116 to the communications application 122 of the computing device 114 through the server 106. In this case, the user 102 may enter the message 116 into the communications application 120 of the computing device 104. The geofence alert application 118 may include, in the message 116, data indicating that the message 116 should be used to determine a likely schedule for the user 108. The server 106 may receive the message 116 and transmit the message 116 to the communications application 122 of the computing device 114. The server 106 may identify the data indicating that the message 116 should be used to determine a likely schedule for the user 108 and provide the message 116 to the geofence alert manager 132 of the server 106.

In instances where the user 102 receives a message from the user 112, the communications application 120 may receive the message. The geofence alert application 118 may monitor the incoming messages. In this case, the geofence alert application 118 may determine that the user 112 sent the message and that the messages to and from the user 102 should be used to determine the likely schedule of the user 108. The geofence alert application 118 may transmit the message, data identifying the users 102 and/or 112 as the recipient and sender, a timestamp, data indicating to use the message to generate the likely schedule of the user 108, and/or any other similar information.

In stage B, the user 102 may be communicating with the user 108. The user 108 may be using the computing device 110. The computing device 110 may be any type of computing device. For example, the computing device 110 may be a mobile phone, tablet device, laptop computer, desktop computer, smart watch, and/or any other type of device that is configured to transmit and receive information. The computing device 110 may communicate over a wired and/or wireless connection that may include a cellular connection, Wi-Fi connection, short range radio connection, infrared connection, and/or any other similar connection. The computing device 110 may be configured to communicate directly with the computing devices 104 and 114 or through the server 106.

As noted above, the user 102 may indicate to the geofence alert application 118 that the user 102 would like to monitor the location of the user 108. The user 102 may indicate to the geofence alert application 118 to use the communications between the user 102 and the user 108 to determine the likely schedule of the user 108. In some implementations, the user 108 may provide permission to the geofence alert application 118 to use the communications between the user 102 and the user 108 to determine the likely schedule of the user 108.

To monitor the communications between the user 102 and the user 108, the geofence alert application 118 may communicate with the communications application 120 to identify the communications between the computing device 104 of the user 102 and the computing device 114 of the user 112. The geofence alert application 118 may communicate with the communications application 120 to identify the communications between the computing device 104 of the user 102 and the computing device 110 of the user 108. The geofence alert application 118 may receive communications from the communications application 120 and provide them to the server 106 along with data include the time and date of the communication.

In the example of FIG. 1, the user 102 may transmit a message 128 to the user 108. The user 102 may use the communications application 120 to compose the message 128. For example, the user 102 may write the message 128 of "Let me know when soccer practice is finished." The user 102 may send the message 128 to the user 108. The communications application 126 of the computing device 110 may receive the message 128. The user 108 may view the message 128 on the computing device 110. The geofence alert application 118 may monitor the messages of the communications application 120 and provide data indicating the message 128 to the server 106. The data indicating the message 128 may include the message 128, data identifying the users 102 and/or 108 as the sender and recipient, a timestamp, data indicating to use the message 128 to generate the likely schedule of the user 108, and/or any other similar information.

In some implementations, communications application 120 may transmit the message 128 to the communications application 126 of the computing device 110 through the server 106. In this case, the user 102 may enter the message 128 into the communications application 120 of the computing device 104. The geofence alert application 118 may include, in the message 128, data indicating that the message 128 should be used to determine a likely schedule for the user 108. The server 106 may receive the message 128 and transmit the message 128 to the communications application 126 of the computing device 110. The server 106 may identify the data indicating that the message 128 should be used to determine a likely schedule for the user 108 and provide the message 128 to the geofence alert manager 132 of the server 106.

In instances where the user 102 receives a message from the user 108, the communications application 120 may receive the message. The geofence alert application 118 may monitor the incoming messages. In this case, the geofence alert application 118 may determine that the user 108 sent the message and that the messages to and from the user 102 should be used to determine the likely schedule of the user 108. The geofence alert application 118 may transmit the message, data identifying the users 102 and/or 108 as the recipient and sender, a timestamp, data indicating to use the message to generate the likely schedule of the user 108, and/or any other similar information.

In addition to communications data and in stage C, the server 106 may receive additional information 130 from the user 102. The geofence alert application 118 may provide an interface that allows the user 102 to enter information related to the user 108 that the server 106 may use to determine the likely schedule of the user 108. The additional information 130 may include various types of data. For example, the additional information 130 may include data identifying the types of activities in which the user 108 participates, the locations of the activities in which the user 108 participates, the times that the user 108 participates in the activities, and/or any other similar information. In some implementations, the user 102 may indicate which activities, locations, and times corresponds to each other. For example, the user 102 may indicate that swimming is at the Springfield pool on Tuesday from 4 pm-5 pm. In some implementations, the user 102 may not indicate which activities, locations, and times corresponds to each other. For example, the user 102 may indicate that the user 108 participates in soccer, piano, and swimming. The user 102 may also indicate that the user 108 participates in activities at the Springfield pool and the Springfield school, without indicating which activities are at each location. In some implementations, the user 102 may identify an activity, location, and/or time without the corresponding activity, location, and/or time. For example, the user may identify the time 3-4 pm on Friday and not indicate that time is piano lessons for the user 108 at 123 Elm St.

In some implementations, the additional information 130 may include details related to common elements among the schedule of the user 108 and other users. For example, the additional information 130 may indicate that soccer practice includes another user. This user may be another member of the family of the user 108, such as a sibling of the user 108. The additional information 130 may indicate whether another user will be meeting the user 108 at the end of an event or will be dropping off the user 108 at the beginning of the event. For example, the user 112 may be picking up the user 108 at the end of soccer practice.

In the example of FIG. 1, the user 102 provides the additional information 130 to the server 106. The user 102 accesses the geofence alert application 118 on the computing device 104 and enters the additional information 130 into an interface of the geofence alert application 118 on the computing device 104. The additional information 130 may indicate that the user 108 is involved in activities that include soccer, piano, and swimming. The additional information 130 may indicate that the user 108 is involved in activities at Springfield school and Springfield pool. The additional information 130 may indicate that soccer is on Monday from 3 pm to 4 pm.

The server 106 may include a geofence alert manager 132 that is configured to process the message 116 and corresponding data, the message 128 and corresponding data, and the additional information 130. The geofence alert manager 132 generates the likely schedule of the user 108 based on processing the message 116 and corresponding data, the message 128 and corresponding data, and the additional information 130. The geofence alert manager 132 may also specify the frequency at which the computing device 110 of the user 108 should report the location of the user 108 to the user 102. This frequency may change depending on the likely schedule of the user 108 and how the location of the user 108 aligns with the likely schedule. The geofence alert manager 132 may store the likely schedule of the user 108 in a storage device of the server 106 or accessible by the server 106. In some instances, the geofence alert manager 132 may store the likely schedule of the user 108 on the computing devices 104, 110, and/or 114 for review by a corresponding user.

In addition to analyzing the message 116 and corresponding data, the message 128 and corresponding data, and the additional information 130, the geofence alert manager 132 may analyze location data of the computing devices 104, 110, and/or 114. The device locations 138 may store the location data of the computing devices 104, 110, and/or 114. The device locations 138 may include data related to the current and previous locations of the computing devices 104, 110, and/or 114. The server 106 may include a mobility manager 136 that is configured to store the location data in the device locations 138. The mobility manager 138 may be configured to monitor the location of the computing devices 104, 110, and/or 114 that are connected to the server 106 through a wireless base station. The location of the computing devices 104, 110, and/or 114 may include the location of the wireless base station to which the computing devices 104, 110, and/or 114 are connected and/or GPS data received from the computing devices 104, 110, and/or 114.

In some implementations, the mobility manager 136 may determine the location of the computing devices 104, 110, and/or 114 at periodic intervals, such as every five seconds. In some implementations, the mobility manager 136 may determine the location of the computing devices 104, 110, and/or 114 when the computing devices 104, 110, and/or 114 connect to a different wireless base station and/or provide updated GPS data. In some implementations, the mobility manager 136 may determine the location of the computing devices 104, 110, and/or 114 relative to the base station with which the computing device is communicating. In this case, the mobility manager 136 may determine the relative location based on data collected from the base station such as signal strength and direction of communications between the computing devices 104, 110, and/or 114 and the base station. The mobility manager 136 may also determine the relative location based on the location of the base station and GPS data received from the computing devices 104, 110, and/or 114. The relative location data may include a distance between the computing devices 104, 110, and/or 114 and the base station, the cardinal direction from the base station to the computing devices 104, 110, and/or 114, and/or any other similar measurements.

The server 106 may include historical data 140. The historical data 140 may include data related to previous actions of the users 102, 108, and/or 112. The actions may be those that the users 102, 108, and/or 112 perform with their respective computing devices 104, 110, and 114. The actions may include sending and receiving messages similar to the messages 116 and 128. The historical data 140 may include data related to the sender and recipient of a message, the time and date of the message, and/or the content of the message. The historical data 140 may include messages sent between the users 102, 108, and/or 112 and from or to the users 102, 108, and/or 112 to additional users. The historical data 140 may also include data related to phone calls between the between the users 102, 108, and/or 112 and from or to the users 102, 108, and/or 112 to additional users. The phone call data may include data identifying the caller and callee, the time and date of the phone call, the duration of the phone call, a transcription of the phone call, and/or any other similar phone call related information. The historical data 140 may also include network activity of the users 102, 108, and/or 112 on their respective computing devices 104, 110, and 114. The network activity may include network data transmitted and received by various applications on the computing devices 104, 110, and 114. The various applications may include social networking applications, new applications, weather applications, gaming applications, and/or any other similar applications that transmit or receive network data.

In some implementations, the users 102, 108, and/or 112 and other users may adjust various permissions that specify the type of data that the server 106 may store in the historical data 140. For example, the user 112 may specify that data related to telephone conversations of the user 112 not be stored in the historical data 140. The user 102 may specify that network data related to a particular social media application not be stored in the historical data 140. In some implementations, some users may have the ability to adjust the permissions of other users. This may be the case if user 102 is a parent of the user 108. The user 102 may indicate for the server 106 not to store transcriptions of telephone conversations of the user 108 in the historical data 140.

The geofence alert manager 132 may include various components that are each configured to generate different portions of the likely schedule of the user 108. The geofence alert manger 132 may include a future location identifier 142 and a future time identifier 146. The future location identifier 142 may identify the likely future locations of the user 108, including geofences for some of the locations. The future time identifier 146 may identify the times when the user 108 will likely be at the locations and when the user 108 will be likely arriving or leaving the locations. The geofence alert manger 132 may also include location frequency identifier 148 that may specify the frequency at which the computing device 110 should provide location data to the computing device 104. The frequency may be based on whether the computing device 110 is at a likely location at the corresponding time.

The geofence alert manger 132 may also include a communications analyzer 144 that may analyze the communications among the users 102, 108, and 112. In stage D, the communications analyzer 144 may analyze the messages 116 and 128, additional messages to and from the users 102, 108, and 112, and the communication related data in the historical data 140. The communications analyzer 144 may identify those communications that are likely related to the schedule of the user 108. The communications analyzer 144 may use the additional information 130 to assist in identifying the communications that are likely related to the schedule of the user 108. The communications analyzer 144 may use various rules to determine whether a communication is related to the schedule of the user 108. An example rule may indicate that a message is relevant to the schedule of the user 108 if it includes terms that match those of the additional information. For example, the communications analyzer 144 determines that the message 116 includes the term "piano," that matches the term "piano" in the additional information 130. Another example rule may indicate that a message is relevant if the recipient or the sender is the user 108. Another example rule may indicate that a message is relevant if the message identifies the user 108. Another example rule may indicate that a message is relevant if the message was sent or received within a threshold time period of a time period identified in the additional information 130. For example, if the user 102 received a message between 2:30 pm and 4:30 pm on Monday, which is within thirty minutes of the 3 pm-4 pm time period identified in the additional information, then the communications analyzer 144 may determine that the message is related to the schedule of the user 108.

The future location identifier 142 may use various rules and/or models to identify the likely locations of the user 108. The future location identifier 142 may use the relevant communications identified by the communications analyzer 144, the device locations 138, the additional information 130, and/or any other similar information to determine the likely locations of the user 108. The models may be configured to receive the relevant communications identified by the communications analyzer 144, the device locations 138, the additional information 130, and/or any other similar information and output data indicating one or more locations of activities. The models may also output data indicating a geofence around the locations. Some models may be configured to receive different types of data. For example, one model may be configured to receive the relevant communications identified by the communications analyzer 144 and the additional data 130. Another model may be configured to receive the relevant communications identified by the communications analyzer 144 and the device locations 138. The future location identifier 142 may be configured to select the appropriate model based on the data that the future location identifier 142 received.

The rules may specify how to compare the relevant communications identified by the communications analyzer 144, the device locations 138, the additional information 130, and/or any other similar information. Based on those comparisons a rule may specify one or more locations of activities. The rules may also specify a geofence around the locations. An example rule may indicate that locations identified in the relevant communications identified by the communications analyzer 144 should be included in the locations of activities. Another example rule may indicate that locations identified in the additional information 130 should be included in the locations of activities. Another example rule may indicate that locations where the computing device 110 is located for more than a period of time, such as an hour, should be included in the locations of activities. Another example rule may indicate that locations where the computing device 110 and one or more of the computing devices 104 and 114 have been located at the same time should be included in the locations of activities. This rule may exclude the location of the home of the user 108 from being included in the locations of activities.

The future time identifier 146 may use various rules and/or models to identify the times when the user 108 will likely be at the identified locations. The future time identifier 146 may use the relevant communications identified by the communications analyzer 144, the device locations 138, the additional information 130, the locations identified by the future location identifier 142, and/or any other similar information to determine the times when the user 108 will likely be at the identified locations. The models may be configured to receive the relevant communications identified by the communications analyzer 144, the device locations 138, the additional information 130, the locations identified by the future location identifier 142, and/or any other similar information and output data indicating times when the user 108 will likely be at the identified locations. Some models may be configured to receive different types of data. For example, one model may be configured to receive the relevant communications identified by the communications analyzer 144 and the locations identified by the future location identifier 142. Another model may be configured to receive the relevant communications identified by the communications analyzer 144, the device locations 138, and the locations identified by the future location identifier 142. The future time identifier 146 may be configured to select the appropriate model based on the data that the future time identifier 146 received.

In some implementations, a model may be configured to receive the relevant communications identified by the communications analyzer 144, the device locations 138, the additional information 130, a single location identified by the future location identifier 142, and/or any other similar information. In this case, the model may output data indicating the time or time period when the user 108 will likely be at the single location. The future time identifier 146 may provide the model with each location identified by the future location identifier 142 along with the other inputs to determine the respective time or time periods when the user 108 will likely be at each identified location.

The rules may specify how to compare the relevant communications identified by the communications analyzer 144, the device locations 138, the additional information 130, the locations identified by the future location identifier 142, and/or any other similar information. Based on those comparisons a rule may specify a time or time range when the user 108 will likely be at the identified locations. An example rule may indicate that times identified in the relevant communications identified by the communications analyzer 144 should be included in the locations of activities. Another example rule may indicate that times identified in the additional information 130 should be included in the locations of activities. Another example rule may indicate that times when the computing device 110 is at an identified for more than a period of time, such as an hour, should be included in the times. Another example rule may indicate that times when the computing device 110 and one or more of the computing devices 104 and 114 have been located at an identified location should be included in the times. This rule may exclude the times when the computing device 110 is located at the home of the user because the home location may not be included in the identified locations.

The rules may also specify how to match an identified location with an identified time. An example rule may indicate that if the computing device 110 was located at an identified location during an identified time or time period, then the future time identifier 146 pairs that location with that time. Another example rule may indicate that if a time and location are in the same communications identified by the communications analyzer 144, then the future time identifier 146 pairs that location with that time.

In some implementations, the geofence alert manager 132 may present the pairs of identified locations and identified times for the user 108 to the user 102. In this case, the geofence alert manager 132 may provide data identifying the pairs of identified locations and identified times to the geofence alert application 118 of the computing device 104. The geofence alert manager 132 may select the geofence alert application 118 of the computing device 104 because the user 102 requested to monitor the user 108. The geofence alert application 118 may output an interface on the display of the computing device 104 that includes the pairs of identified locations and identified times. The user 102 may review the pairs of identified locations and identified times and update any that may be incorrect. The geofence alert application 118 may provide the updated pairs of identified locations and identified times to the geofence alert manager 132.

In some implementations, the future location identifier 142 may identify a location without a corresponding geographic location. In this case, the future location identifier 142 may compare the locations of the computing devices 104, 108, and/or 114, the identified locations, and a map. The future location identifier 142 may identify likely geographic locations for each location by searching for the location on a map. For example, the future location identifier 142 may search a map for the location, "Springfield school" and identify the corresponding geographic location of the "Springfield school." In some instances, the future location identifier 142 may determine whether the computing devices 104, 108, and/or 114 have visited the corresponding geographic location.

The future location identifier 142 may identify a geofence around each of the locations. The future location identifier 142 may compare the locations of the computing devices 104, 108, and/or 114, the identified locations, and a map. The future location identifier 142 may identify the boundary of an identified location by analyzing the geographic location of the identified location on a map. In some implementations, the boundary may be the perimeter of a building. In some implementations, the boundary may be the property line around the location. In some implementations, the future location identifier 142 may compare the movements of various computing devices that may include the computing devices 104, 108, and/or 114 to determine the movement patterns of people at each location. The future location identifier 142 may determine the geofence of a location by determining how people move about a location after arriving and before leaving.

The location frequency identifier 148 may determine the frequencies at which the computing device 110 should provide its location to the computing device 104. The frequency may indicate the number of times per minute that the computing device 110 should provide its location to the computing device 104. The location frequency identifier 148 may specify a frequency if the computing device 110 is at the identified location at the identified time. The location frequency identifier 148 another frequency if the computing device 110 is not at the identified location at the identified time. The location frequency identifier 148 may specify another frequency for when the computing device 110 will likely be crossing a geofence. The computing device 110 may likely cross a geofence at the end of a time period identified by the future time identifier 146.

As an example, the location frequency identifier 148 may specify a frequency for the computing device 110 to provide location data to the computing device 104 every hour while the user 108 is scheduled to be at Springfield School, which may be between 8 am and 3 pm. If during that period, the computing device 110 crosses the geofence of the Springfield School, then the location frequency identifier 148 may specify for the computing device 110 to increase the frequency to every minute. The location frequency identifier 148 may also specify to increase the frequency within fifteen minutes of the beginning and ending of the school time period when the computing device 110 may be crossing the geofence of the Springfield School. The location frequency identifier 148 may specify to increase the frequency to every two minutes during the periods of 7:45 am-8:15 am and 2:45 pm-3:15 pm. In some implementations, the location frequency identifier 148 may specify to decrease the frequency if the computing device 110 has reached an expected location. For example, if the computing device crosses the geofence of the Springfield School at 7:55 am, then the location frequency identifier 148 may indicate to decrease the frequency to every hour. In some implementations, the location frequency identifier 148 may specify time periods for adjusting the frequency based on expected commute times. For example, if the time to commute from a home location to Springfield School is thirty minutes, then the location frequency identifier 148 may specify to increase the frequency to every two minutes during the period of 7:30 am-8:00 am.

In stage E, the geofence alert manager 132 may provide the location and geofence data 150, time data 154, and frequency data 152 to the geofence alert client 124. The location and geofence data 150 may include data that the future location identifier 142 generated. For example, the location and geofence data 150 may specify the location of a pool, the geographic location of the pool, and geofence data indicating that the geofence is two hundred yards around the geographic location of the pool. The time data 154 may indicate that the user 108 is expected to be at the pool location from 4 to 5 pm on Friday. The frequency data 152 may indicate that if the computing device 110 is located at an expected location during an expected time based on the location and geofence data 150 and the time data 154, then the frequency should be six pings per hour, or location notifications to the computing device 104 per hour. The frequency data 152 may also indicate that if the computing device 110 is located at an unexpected location, then the frequency should be sixty pings per hour, or location notifications to the computing device 104 per hour.

The geofence alert client 124 may receive the location and geofence data 150, time data 154, and frequency data 152. As the computing device 110 moves from location to location, the geofence alert client 124 compares the location of the computing device 110 to the expected location specified in the location and geofence data 150 and time data 154. If the computing device 110 is at an expected location at an expected time, then the geofence alert client 124 may transmit the location of the computing device 110 to the computing device 104 at the specified frequency of the frequency data. If the computing device 110 is not at an expected location at an expected time, then the geofence alert client 124 may transmit the location of the computing device 110 to the computing device 104 at another specified frequency of the frequency data. The frequency data 152 may specify additional frequencies such as during a commute, when crossing a geofence, at the beginning and end of being in a location, and/or any other similar movement.

In some implementations, the computing device 110 may not transmit the location information to the computing device 104 at the requested interval. This may be because the computing device 104 has been powered off and/or the battery is depleted. In some instances, the computing device 104 may request that the server 106 and/or computing device 110 provide location information to the computing device 104 if the computing device 104 has not received location data within a threshold period of time.

In some implementations, the geofence alert manager 132 may provide instructions to the computing device 110 regarding whether to provide location data to the computing device 104 or the computing device 114. In some instances, the computing devices 104 or 114 may provide information on which computing device to provide the location data. The users 102 and/or 112 may provide an indication of which computing device to provide the location data when the users 102 and/or 112 are reviewing the pairs of identified locations and identified times. In some instances, the users 102 and/or 112 may add additional pairs of locations and times and may indicate whether to provide the location data to the computing device 104 and/or 114.

Figure 2:
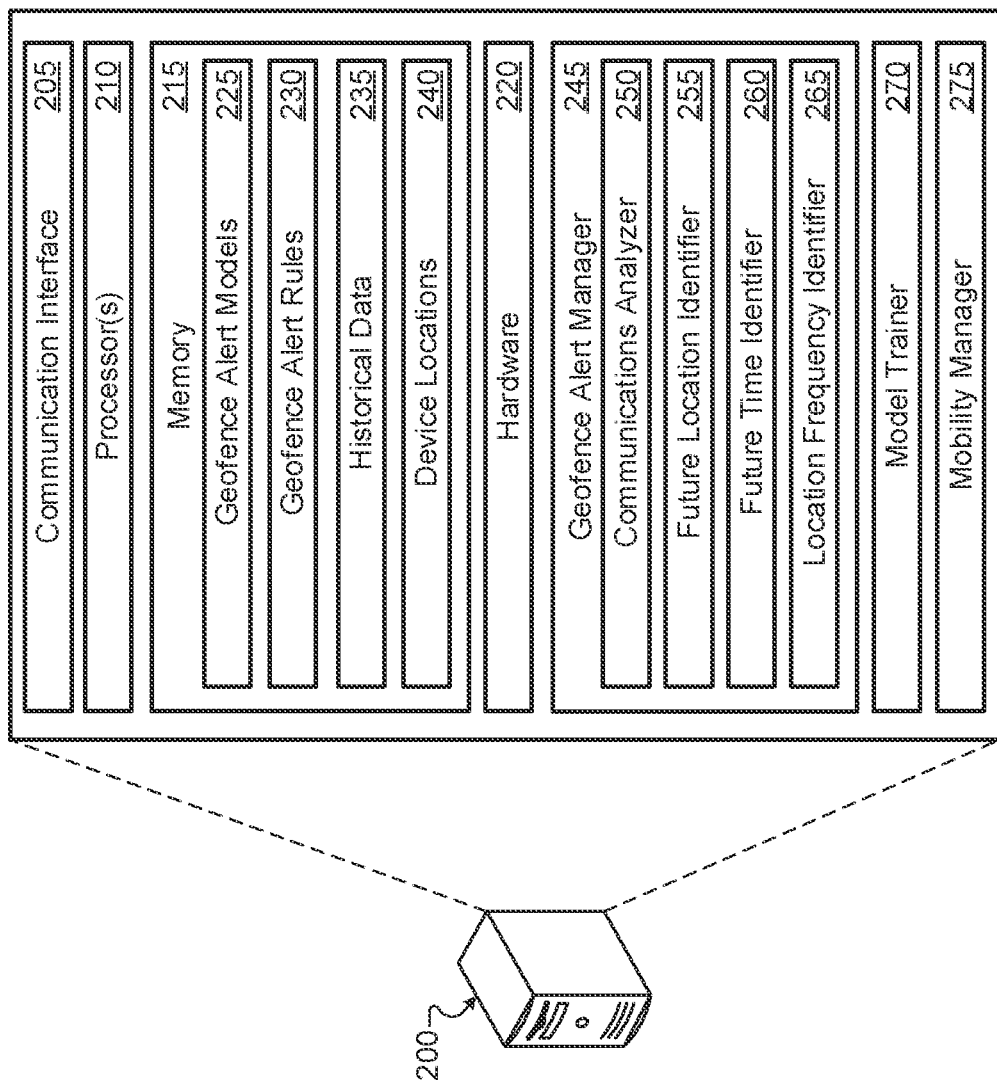
FIG. 2 illustrates an example server that is configured to generate instructions for a computing device regarding outputting location data at varying frequencies depending on where the computing device is located.

FIG. 2 illustrates an example server 200 that is configured to generate instructions for a computing device regarding outputting location data at varying frequencies depending on where the computing device is located. The server 200 may be any type of computing device that is configured to communicate with other computing devices. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 106 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate using over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a geofence alert manager 245. The geofence alert manager 245 may be similar to the geofence alert manager 132 of FIG. 1. The geofence alert manager 132 is configured to generate a likely schedule of a first user based on processing communications exchanged between the first user and other users and among the other users and based on additional information provided the other users. A second user may request that the computing device of the first user provide the computing device of the second user with location information of the computing device of the first user. The likely schedule of the first user may be related to when the computing device of the second user should provide the location information to the computing device of the second user.

The geofence alert manager 245 may include a communications analyzer 250. The one or more processors 210 may implement the communications analyzer 250, which may be similar to the communications analyzer 144 of FIG. 1. The communications analyzer 250 may be configured to analyze messages between the first user and other users and among the other users. The communications analyzer 250 may analyze the communications to identify those communications that are likely related to the schedule of the first user. The communications analyzer 250 may use the additional information provided by the second user to assist in identifying the communications that are likely related to the schedule of the first user. The additional information may include data identifying the types of activities in which the first user participates, the locations of the activities in which the first user participates, the times that the first user participates in the activities, and/or any other similar information. In some implementations, the additional information may indicate which activities, locations, and times corresponds to each other. For example, the additional information may indicate that swimming is at the Springfield pool on Tuesday from 4 pm-5 pm. In some implementations, the additional information may not indicate which activities, locations, and times corresponds to each other. For example, the additional information may indicate that the first user participates in soccer, piano, and swimming. The additional information may also indicate that the first user participates in activities at the Springfield pool and the Springfield school, without indicating which activities are at each location.

In some implementations, the additional information may identify an activity, location, and/or time without the corresponding activity, location, and/or time. For example, the additional information may identify the time 3-4 pm on Friday and not indicate that time is piano lessons for the first user at 123 Elm St. In some implementations, the additional information may include details related to common elements among the schedule of the first user and other users. For example, the additional information may indicate that soccer practice includes another user. This user may be another member of the family of the first user, such as a sibling of the first user. The additional information may indicate whether another user will be meeting the first user at the end of an event or will be dropping off the first user at the beginning of the event. For example, another parent of the first user may be picking up the first user at the end of soccer practice.

The communications analyzer 250 may use various rules to determine whether a communication is related to the schedule of the first user. An example rule may indicate that a message is relevant to the schedule of the first user if it includes terms that match those of the additional information. For example, the communications analyzer 250 determines that a message from the second user includes the term "piano," that matches the term "piano" in the additional information. Another example rule may indicate that a message is relevant if the recipient or the sender is the first user. Another example rule may indicate that a message is relevant if the message identifies the first user. Another example rule may indicate that a message is relevant if the message was sent or received within a threshold time period of a time period identified in the additional information. For example, if the second user received a message between 2:30 pm and 4:30 pm on Monday, which is within thirty minutes of the 3 pm-4 pm time period identified in the additional information, then the communications analyzer 250 may determine that the message is related to the schedule of the user 108.

The one or more processors 210 may implement a mobility manager 275. The mobility manager 275 may be similar to the mobility manager 136 of FIG. 1. The mobility manager 275 may monitor the locations of the computing device of the first user and other computing devices communicating with the server 200. The mobility manager 275 may be configured to monitor the location of a computing device that is connected to the server 200 through a wireless base station. The location of the computing device may include the location of the wireless base station to which the computing device is connected and/or GPS data received from the computing device. The mobility manager 275 may store data indicating the locations of the computing devices in the device locations 240 and times when the computing devices were at the identified locations.

In some implementations, the mobility manager 275 may determine the location of a computing device at periodic intervals, such as every five seconds. In some implementations, the mobility manager 275 may determine the location of a computing device when the computing device connects to a different wireless base station and/or provides updated GPS data. In some implementations, the mobility manager 275 may determine the location of the computing device relative to the base station with which the computing device is communicating. In this case, the mobility manager 275 may determine the relative location based on data collected from the base station such as signal strength and direction of communications between the computing device and the base station. The mobility manager 275 may also determine the relative location based on the location of the base station and GPS data received from the computing device. The relative location data may include a distance between the computing device and the base station, the cardinal direction from the base station to the subscriber device, and/or any other similar measurements.

The geofence alert manager 245 may include a future location identifier 255. The one or more processors 210 may implement the future location identifier 255, which may be similar to the future location identifier 142 of FIG. 1. The future location identifier 255 may use rules from the geofence alert rules 230 and/or models from the geofence alert models 225 to identify the likely locations of the first user. The future location identifier 255 may use the relevant communications identified by the communications analyzer 250, the device locations 240, the additional information received from the second user, and/or any other similar information to determine the likely locations of the first user. The geofence alert models 225 may be configured to receive the relevant communications identified by the communications analyzer 250, the device locations 240, the additional information received from the second user, and/or any other similar information and output data indicating one or more locations of activities. The geofence alert models 225 may also output data indicating a geofence around the locations. Some models may be configured to receive different types of data. For example, one model may be configured to receive the relevant communications identified by the communications analyzer 250 and the additional data. Another model may be configured to receive the relevant communications identified by the communications analyzer 250 and the device locations 240. The future location identifier 255 may be configured to select the appropriate model based on the data that the future location identifier 255 received.

Rules from the geofence alert rules 230 may specify how to compare the relevant communications identified by the communications analyzer 250, the device locations 240, the additional information provided by the second user, and/or any other similar information. Based on those comparisons a geofence alert rule may specify one or more locations of activities. The geofence alert rules 230 may also specify a geofence around the locations. An example rule may indicate that locations identified in the relevant communications identified by the communications analyzer 250 should be included in the locations of activities. Another example rule may indicate that locations identified in the additional information from the second user should be included in the locations of activities. Another example rule may indicate that locations where the computing device of the first user is located for more than a period of time, such as an hour, should be included in the locations of activities. Another example rule may indicate that locations where the computing device of the first user and the computing device of the second user have been located at the same time should be included in the locations of activities. This rule may exclude the location of the home of the first user from being included in the locations of activities.

The geofence alert manager 245 may include a future time identifier 260. The one or more processors 210 may implement the future time identifier 260, which may be similar to the future time identifier 146 of FIG. 1. The future time identifier 260 may use various rules from the geofence alert rules 230 and/or models from the geofence alert models 225 to identify the times when the first user will likely be at the identified locations. The future time identifier 260 may use the relevant communications identified by the communications analyzer 250, the device locations 240, the additional information from the second user, the locations identified by the future location identifier 255, and/or any other similar information to determine the times when the first user will likely be at the identified locations. The geofence alert models 225 may be configured to receive the relevant communications identified by the communications analyzer 250, the device locations 240, the additional information from the second user, the locations identified by the future location identifier 255, and/or any other similar information and output data indicating times when the first user will likely be at the identified locations. Some models may be configured to receive different types of data. For example, one model may be configured to receive the relevant communications identified by the communications analyzer 250 and the locations identified by the future location identifier 255. Another model may be configured to receive the relevant communications identified by the communications analyzer 250, the device locations 240, and the locations identified by the future location identifier 255. The future time identifier 260 may be configured to select the appropriate model based on the data that the future time identifier 250 received.

In some implementations, a model from the geofence alert models 225 may be configured to receive the relevant communications identified by the communications analyzer 250, the device locations 240, the additional information from the second user, a single location identified by the future location identifier 255, and/or any other similar information. In this case, the model may output data indicating the time or time period when the first user will likely be at the single location. The future time identifier 260 may provide the model with each location identified by the future location identifier 255 along with the other inputs to determine the respective time or time periods when the first user will likely be at each identified location.

Rules in the geofence alert rules 230 may specify how to compare the relevant communications identified by the communications analyzer 250, the device locations 240, the additional information from the second user, the locations identified by the future location identifier 255, and/or any other similar information. Based on those comparisons a rule may specify a time or time range when the first user will likely be at the identified locations. An example rule may indicate that times identified in the relevant communications identified by the communications analyzer 250 should be included in the locations of activities. Another example rule may indicate that times identified in the additional information 130 should be included in the locations of activities. Another example rule may indicate that times when the computing device of the first user is at an identified location for more than a period of time, such as an hour, should be included in the times. Another example rule may indicate that times when the computing device of the first user and the computing device of the second user have been located at an identified location should be included in the times. This rule may exclude the times when the computing device of the first user is located at the home of the user because the home location may not be included in the identified locations.

The rules may also specify how to match an identified location with an identified time. An example rule may indicate that if the computing device of the first user was located at an identified location during an identified time or time period, then the future time identifier 260 pairs that location with that time. Another example rule may indicate that if a time and location are in the same communications identified by the communications analyzer 250, then the future time identifier 260 pairs that location with that time.

The one or more processors 210 may implement the model trainer 270. The model trainer 270 may be configured to generate the geofence alert models 225 and/or the geofence alert rules 230 used by the future location identifier 255 and/or the future time identifier 260. The model trainer 270 may generate the geofence alert models 225 and/or the geofence alert rules 230 using the historical data 235. The historical data 235 may include data related to previous actions of the first user, the second user, and other users. The actions may be those that the first user, the second user, and other users perform with their respective computing devices. The actions may include sending and receiving messages. The historical data 235 may include data related to the sender and recipient of a message, the time and date of the message, and/or the content of the message. The historical data 235 may include messages sent between the first and second users and from or to the first or second users. The historical data 235 may also include data related to phone calls between the between the first and second users and from or to the first or second users to additional users. The phone call data may include data identifying the caller and callee, the time and date of the phone call, the duration of the phone call, a transcription of the phone call, and/or any other similar phone call related information. The historical data 235 may also include network activity of the first user, the second user, and other users on their respective computing devices. The network activity may include network data transmitted and received by various applications on the computing devices. The various applications may include social networking applications, new applications, weather applications, gaming applications, and/or any other similar applications that transmit or receive network data.

The model trainer 270 may generate the geofence alert rules 225 by identifying patterns and trends in the historical data 235 and device locations 240. Based on those patterns and trends, the model trainer 270 may generate geofence alert rules that specify likely locations that a user will be or times when the user will be at the likely location if certain conditions are met in the relevant communications identified by the communications analyzer 250, the device locations 240, the additional information from the second user, and/or the locations identified by the future location identifier 255. For example, the model trainer 270 may analyze the locations of the computing device of various users and determine locations where two users are co-located and one of the users was at the location for more than a threshold period of time, such as an hour. If the two users were co-located at those locations on the same day of the week during similar times, then the model trainer 270 may generate a geofence alert rule that indicates that if two users are co-located at a similar time for consecutive weeks, then the user who is at the location for more than a threshold period of time will likely be at that location at the similar time the following weeks. As another example, the model trainer 270 may analyze communications between two users. The model trainer 270 may determine that the two users exchanged communications related to a location and a date and one of the users was later at the location on the date. The model trainer 270 may determine a geofence alert rule that indicates that a user will likely be at a location if communications of that user are related to a location and a date.

The model trainer 270 may be configured to train the geofence alert models 225 using machine learning, the historical data 235, and the device locations 240. The geofence alert models 225 may be configured to receive and output various types of data. Some of the geofence alert models 225 may be configured to receive the relevant communications identified by the communications analyzer 250, the device locations 240, and the additional information from the second user. Some of these models may also be configured to receive a location identified by the future location identifier 255. These models may be configured to output the likely times that the first user will be at a scheduled location. In instances where the model receives a location, then the model may output the likely time when the first user will be at the location.

Other geofence alert models 225 may be configured to receive the relevant communications identified by the communications analyzer 250, the device locations 240, the additional information from the second user. Some of these other models may also be configured to receive a time identified by the future time identifier 260. These other models may be configured to output the likely location or locations where the first user will be. In instances where the model receives a time, then the model may output the likely location where the first user will be at the received time.

The model trainer 270 may use the historical data 235 and the device locations 240 to generate data samples. The model trainer 270 may train the geofence alert models 225 using the data samples and machine learning. A data sample may include data related to a first user. The first user may be the same or different for each data sample. A data sample may include communications to and from the first user, communications relevant to the first user that may not be to or from the first user, locations of the device of the first user, locations of devices that may be on the same account as the device of the first user, locations of devices that have exchanged communications with the device of the first user, dates and time that correspond to when the devices were at the locations, and/or previous additional information related to the first user. A data sample may include a flag that indicates the location and/or time that corresponds to an appropriate output for the data sample. Various data samples may include similar data with a different flagged location and/or time.

The model trainer 270 may group data samples that include the same types of data. For example, the model trainer 270 may group data samples that include communications to and from the first user, locations of the device of the first user, and dates and time that correspond to when the device was at the locations. Other data samples in this group may be related to a different user and may include communications to and from the different user, locations of the device of the different user, and dates and time that correspond to when the device was at the locations. The data samples may include flags on different locations and/or times. The model trainer 270 may train various models with these data samples. The model trainer 270 may train a first model with the data samples with flags on the locations. This model may be configured to receive communications to and from a user, locations of the device of the user, and dates and times when the user was at the locations. The model may be configured to output a likely location where the user will be. The model trainer 270 may train a second model with the data samples with flags on the times. This model may be configured to receive communications to and from a user, locations of the device of the user, and dates and times when the user was at the locations. The model may be configured to output a time when the user will be at a predictable location.

The model trainer 270 may train a third model with the data samples with flags on the times and locations. This model may be configured to receive communications to and from a user, locations of the device of the user, dates and times when the user was at the locations, and a location where the user will likely be. The model may be configured to output a time when the user will be at the likely location. The model trainer 270 may train a fourth model with the data samples with flags on the times and locations. This model may be configured to receive communications to and from a user, locations of the device of the user, dates and times when the user was at the locations, and a future time when the user will likely be at a predictable location. The model may be configured to output the likely location where the user will be at the future time. The model trainer 270 may train a fifth model with the data samples with flags on the times and locations. This model may be configured to receive communications to and from a user, locations of the device of the user, and dates and times when the user was at the locations. The model may be configured to output a likely location and time when and where the user will be in the future.

The model trainer 270 may train various geofence alert models that are configured to receive different types of data and output a time and/or a location. The future location identifier 255 and the future time identifier 260 may be configured to select the appropriate geofence alert models 225 based on the data received. The future location identifier 255 and the future time identifier 260 may use a combination of the geofence alert models 225 and geofence alert rules 230. For example, the future location identifier 255 and/or the future time identifier 260 may determine whether there is a geofence alert rule 225 that specifies how to compare the received data. If there is, then the future location identifier 255 and/or the future time identifier 260 may use the geofence alert rule. If there is not a rule, then the future location identifier 255 and/or the future time identifier 260 may use the geofence alert models 225.

In some implementations, the geofence alert manager 245 may present the pairs of identified locations and identified times to a user for review. In this case, the geofence alert manager 245 may provide data identifying the pairs of identified locations and identified times to the computing device of a second user who requested to monitor the first user. The computing device of the second user may output an interface on the display of the computing device that includes the pairs of identified locations and identified times. The second user may review the pairs of identified locations and identified times and update any that may be incorrect. The computing device may provide the updated pairs of identified locations and identified times to the geofence alert manager 245.

The future location identifier 255 may identify a geofence around each of the locations. The future location identifier 255 may compare the locations of the computing devices of the first and second users, the identified locations, and a map. The future location identifier 255 may identify the boundary of an identified location by analyzing the geographic location of the identified location on a map. In some implementations, the boundary may be the perimeter of a building. In some implementations, the boundary may be the property line around the location. In some implementations, the future location identifier 255 may compare the movements of various computing devices that may include the computing devices of the first and second users to determine the movement patterns of people at each location. The future location identifier 255 may determine the geofence of a location by determining how people move about a location after arriving and before leaving.

The geofence alert manager 245 may include a location frequency identifier 265. The one or more processors 210 may implement the location frequency identifier 265, which may be similar to the location frequency identifier 148 of FIG. 1. The location frequency identifier 265 may determine the frequencies at which the computing device of the second user should provide its location to the computing device of the first user. The frequency may indicate the number of times per minute that the computing device of the second user should provide its location to the computing device of the first user. The location frequency identifier 265 may specify a frequency if the computing device of the second user is at the identified location at the identified time. The location frequency identifier 265 another frequency if the computing device of the second user is not at the identified location at the identified time. The location frequency identifier 265 may specify another frequency for when the computing device of the second user will likely be crossing a geofence. The computing device of the second user may likely cross a geofence at the end of a time period identified by the future time identifier 260.

As an example, the location frequency identifier 265 may specify a frequency for the computing device of the second user to provide location data to the computing device of the first user every hour while the first user is scheduled to be at Springfield School, which may be between 8 am and 3 pm. If during that period, the computing device of the second user crosses the geofence of the Springfield School, then the location frequency identifier 265 may specify for the computing device of the second user to increase the frequency to every minute. The location frequency identifier 265 may also specify to increase the frequency within fifteen minutes of the beginning and ending of the school time period when the computing device of the second user may be crossing the geofence of the Springfield School. The location frequency identifier 265 may specify to increase the frequency to every two minutes during the periods of 7:45 am-8:15 am and 2:45 pm-3:15 pm. In some implementations, the location frequency identifier 265 may specify to decrease the frequency if the computing device of the second user has reached an expected location. For example, if the computing device crosses the geofence of the Springfield School at 7:55 am, then the location frequency identifier 265 may indicate to decrease the frequency to every hour. In some implementations, the location frequency identifier 265 may specify time periods for adjusting the frequency based on expected commute times. For example, if the time to commute from a home location to Springfield School is thirty minutes, then the location frequency identifier 265 may specify to increase the frequency to every two minutes during the period of 7:30 am-8:00 am.

The geofence alert manager 245 may provide the location and geofence data, time data, and frequency data to the computing device of the first user. The location and geofence data may include data that the future location identifier 255 generated. For example, the location and geofence data may specify the location of a pool, the geographic location of the pool, and geofence data indicating that the geofence is two hundred yards around the geographic location of the pool. The time data may indicate that the first user is expected to be at the pool location from 4 to 5 pm on Friday. The frequency data may indicate that if the computing device of the first user is located at an expected location during an expected time based on the location and geofence data and the time data, then the frequency should be six pings per hour, or location notifications to the computing device of the second user per hour. The frequency data may also indicate that is the computing device of the first user is located at an unexpected location, then the frequency should be sixty pings per hour, or location notifications to the computing device of the second user per hour.

Figure 3:
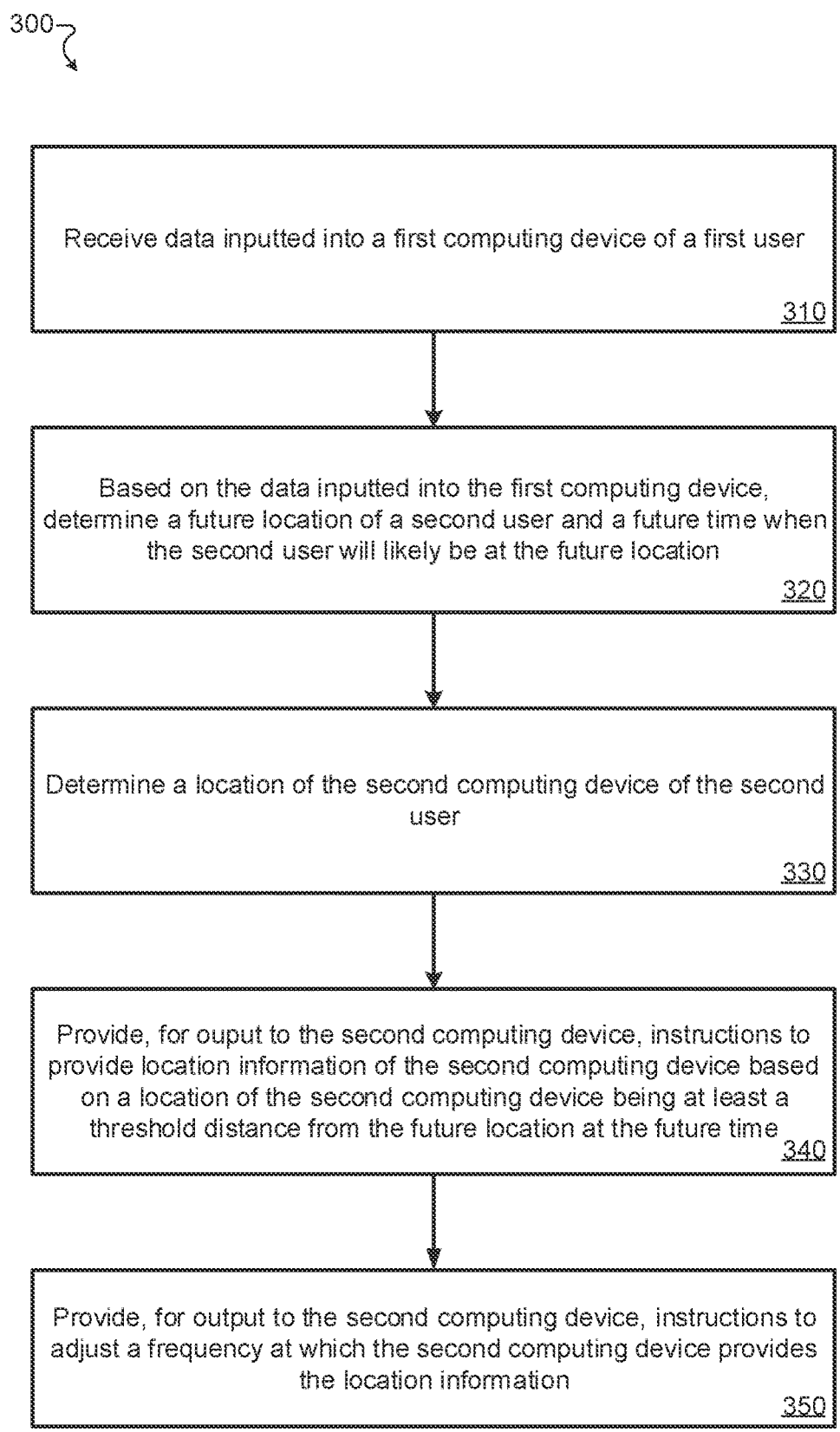
FIG. 3 is a flowchart of an example process for generating instructions for a computing device regarding outputting location data at varying frequencies depending on where the computing device is located.

FIG. 3 is a flowchart of an example process 300 for generating instructions for a computing device 110 regarding outputting location data at varying frequencies depending on where the computing device 110 is located. In general, the process 300 determines the likely locations where the computing device 110 will be located and the time when the computing device 110 will likely be at those locations. The process 300 instructs the computing device 110 to provide its location data to another computing device 104 at varying frequencies depending on how the actual location of the computing device 110 matches the likely locations. The process 300 will be described as being performed by the server 106 of FIG. 1 and will include references to other components in FIG. 1. In some implementations, the process 300 may be performed by the server 200 of FIG. 2.

The server 106 receives data from a first computing device 104 of a first user 102 (310). The data received from the first computing device 104 may include data related to the activities of a second user 108. The additional information 130 may include data identifying the types of activities in which the second user 108 participates, the locations of the activities in which the second user 108 participates, the times that the second user 108 participates in the activities, and/or any other similar information. In some implementations, the information may indicate which activities, locations, and times corresponds to each other. In some implementations, the first user 102 may not indicate which activities, locations, and times corresponds to each other. In some implementations, the information may identify an activity, location, and/or time without the corresponding activity, location, and/or time.

The additional information 130 may differ from calendar information. Calendar information may include a specific time and date of an activity and may include a location of an activity of the second user 108 and/or the first user 102. The first user 102 and other users may enter calendar information into a calendar application, and the additional information into a geofence alert application 118. The additional information 130 may be less precise than calendar information because it may include a list of activities of the second user 108 without any indication of times or locations. The additional information 130 may include times of activities without include locations or identifying the activity. The additional information 130 may include locations without identifying times or activities.

In some implementations, the data inputted into the first computing device 104 may include data related to a third user 112. This data may include communications between the third user 112 and the first user 102. The communications may include text-based messages and transcriptions of telephone calls. The data may also include the time and date of the communications.

In some implementations, the data inputted into the first computing device 104 may include calendar information of the first user 108. The calendar information may include schedule data that includes a date, time, and location of an activity of the first user 108. The calendar information may also include date, time, and locations of activities of other users such as the third user 112 or other users who may be related to the second user 108. In some implementations, the calendar information may include data that describes the relationship between different users. For example, the calendar information may indicate that that the first user 102 and the third user 112 are parents of the second user 108 or that a fourth user is a sibling of the second user 108.

Based on the data inputted into the first computing device 104, the server 106 determines a future location of a second user 108 and a future time when the second user 108 will likely be at the future location (320). In some implementations, the server 106 provides the data inputted into the first computing device 104 to a model. The model may be trained using machine learning. The model may output the future location of a second user 108 and the future time when the second user 108 will likely be at the future location.

In some implementations, the server 106 may receive historical location data that reflects locations where the second computing device 110 was located and times when the second computing device 110 was at the locations. In some implementations, the server 106 may include a mobility manager 136 that generates the historical location data by monitoring the location of the second computing device 110 while the second computing device 110 is connected to the cellular network of the server 106. The data from the mobility manager 136 may include data identifying a base station to which the second computing device 110 is connected. In some implementations, the server 106 may receive historical location data from the second computing device 110. The historical location data may include GPS data and/or triangulation data based on base stations near the second computing device 110. In some implementations, the training data for the model may also include the historical location data.

In some implementations, the server 106 may determine the likely location that the second computing device 110 will be in the future. The server 106 may use the likely location to determine the time at which the second computing device 110 may be at the likely location. In some implementations, the server 106 may determine the time when the second computing device will be at a predictable location in the future. The server 106 may use the time to determine the likely location. In some implementations, the server 106 may determine the time and the likely location based on the data inputted into the first computing device 104 at approximately the same time.

In some implementations, the server 106 may determine a time period that the second computing device 110 will likely be at the likely location. The server 106 may determine the time period based on the data inputted into the first computing device 104, previous locations of the second computing device 110, communications related to the second computing device 110, communications to and from the first computing device 104, and/or any other similar information.

In some implementations, the server 106 may determine a geofence around the future location. The server 106 may determine the geofence based on the previous locations of the second computing device 110, the previous locations of the first computing device 104, and/or the previous locations of the third computing device 114. The server 106 may determine the geofence based on locations of computing devices that have been located at the future location and the movement of those computing devices. The server 106 may determine the geofence based on a map.

In some implementations, the server 106 may provide a request for confirmation that the second user 108 will likely be at the future location at the future time. The server 106 may provide this request to the first user 102. The server 106 may receive data confirming or adjusting the future location and/or the future time.

The server 106 determines a location of the second computing device 110 of the second user 108 (330). The server 106 may identify the second computing device 110 based on data that relates users to computing devices. In some implementations, the first user 102 may provide data identifying the second computing device 110.

The server 106 provides, for output to the second computing device 110, instructions to provide, to the server 106, location information of the second computing device 110 based on a location of the second computing device 110 being at least a threshold distance from the future location at the future time (340). In some implementations, the server 106 may provide instructions to adjust a frequency at which the second computing device 110 provides the location information to the server 106 based on the location of the second computing device 110 being at least the threshold distance from the future location at the future time.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   receiving, by a server, data inputted into a first computing device of a first user;
   based on the data inputted into the first computing device, determining, by the server, a future location of a second user and a future time when the second user will likely be at the future location;
   determining, by the server, a second computing device of the second user; and
   providing, for output to the second computing device, instructions to provide, to the server, location information of the second computing device at a frequency that is adjustable according to a location of the second computing device being at least a threshold distance from the future location at the future time.

2. The method of claim 1, wherein the data inputted into the first computing device of the first user comprises data related to a third user.

3. The method of claim 1, wherein the data inputted into the first computing device of the first user comprises schedule data.

4. The method of claim 1, wherein the data inputted into the first computing device of the first user comprises communication data between the first user and a third user.

5. The method of claim 1, comprising:
   receiving, by the server and from the second computing device, historical location data that reflects locations where the second computing device was located and times when the second computing device was at the locations.

6. The method of claim 1, comprising:
   providing, for output by the server and to the first computing device, a request for confirmation that the second user will likely be at the future location at the future time; and
   receiving, by the server and from the first computing device, a response confirming that the second user will likely be at the future location at the future time,
   wherein providing, for output to the second computing device, the instructions to provide, to the server, the location information of the second computing device at the frequency that is adjustable according to the location of the second computing device being at least the threshold distance from the future location at the future time is further based on the response confirming that the second user will likely be at the future location at the future time.

7. The method of claim 1, comprising:
based on the data inputted into the first computing device, determining, by the server, a geofence around the future location; and
providing, for output to the second computing device, additional instructions to provide, to the server, additional location information of the second computing device based on the location of the computing device being outside of the geofence.

8. The method of claim 1, comprising:
providing, to a model that is trained using machine learning, the data inputted into the first computing device; and
receiving, from the model, data indicating the future location of the second user and the future time when the second user will likely be at the future location.

9. The method of claim 1, comprising:
based on the future location and the future time, determining a time period when the second user will likely be at the future location,
wherein providing, for output to the second computing device, the instructions to provide, to the server, location information of the second computing device at the frequency that is adjustable according to the location of the second computing device being at least the threshold distance from the future location at the future time comprises providing the instructions to provide, to the server, the location information of the second computing device based on the location of the second computing device being at least the threshold distance from the future location during the time period.

10. A system, comprising:
one or more processors; and
memory including a plurality of computer-executable components that are executable by the one or more processors to perform a plurality of actions, the plurality of actions comprising:
receiving, by a server, data inputted into a first computing device of a first user;
based on the data inputted into the first computing device, determining, by the server, a future location of a second user and a future time when the second user will likely be at the future location;
determining, by the server, a second computing device of the second user; and
providing, for output to the second computing device, instructions to provide, to the server, location information of the second computing device at a frequency that is adjustable according to a location of the second computing device being at least a threshold distance from the future location at the future time.

11. The system of claim 10, wherein the data inputted into the first computing device of the first user comprises data related to a third user or schedule data.

12. The system of claim 10, wherein the data inputted into the first computing device of the first user comprises communication data between the first user and a third user.

13. The system of claim 10, wherein the actions comprise:
receiving, by the server and from the second computing device, historical location data that reflects locations where the second computing device was located and times when the second computing device was at the locations.

14. The system of claim 10, wherein the actions comprise:
providing, for output by the server and to the first computing device, a request for confirmation that the second user will likely be at the future location at the future time; and
receiving, by the server and from the first computing device, a response confirming that the second user will likely be at the future location at the future time,
wherein providing, for output to the second computing device, the instructions to provide, to the server, the location information of the second computing device at the frequency that is adjustable according to the location of the second computing device being at least the threshold distance from the future location at the future time is further based on the response confirming that the second user will likely be at the future location at the future time.

15. The system of claim 10, wherein the actions comprise:
based on the data inputted into the first computing device, determining, by the server, a geofence around the future location; and
providing, for output to the second computing device, additional instructions to provide, to the server, additional location information of the second computing device based on the location of the computing device being outside of the geofence.

16. The system of claim 10, wherein the actions comprise:
providing, to a model that is trained using machine learning, the data inputted into the first computing device; and
receiving, from the model, data indicating the future location of the second user and the future time when the second user will likely be at the future location.

17. The system of claim 10, wherein the actions comprise:
based on the future location and the future time, determining a time period when the second user will likely be at the future location,
wherein providing, for output to the second computing device, the instructions to provide, to the server, location information of the second computing device at the frequency that is adjustable according to the location of the second computing device being at least the threshold distance from the future location at the future time comprises providing the instructions to provide, to the server, the location information of the second computing device based on the location of the second computing device being at least the threshold distance from the future location during the time period.

18. One or more non-transitory computer-readable media of a computing device storing computer-executable instructions that upon execution cause one or more computers to perform acts comprising:
receiving, by a server, data inputted into a first computing device of a first user;
based on the data inputted into the first computing device, determining, by the server, a future location of a second user and a future time when the second user will likely be at the future location;
determining, by the server, a second computing device of the second user; and
providing, for output to the second computing device, instructions to provide, to the server, location information of the second computing device at a frequency that is adjustable according to a location of the second computing device being at least a threshold distance from the future location at the future time.

19. The media of claim 18, wherein the data inputted into the first computing device of the first user comprises data related to a third user or schedule data.

20. The media of claim 18, wherein the data inputted into the first computing device of the first user comprises communication data between the first user and a third user.

* * * * *